Aug. 3, 1926.

A. A. PASSMORE 1,594,376

DEVICE FOR TEACHING NUMBERS IN COMBINATION, ANALYSIS, FACTORS, AND MULTIPLES

Filed March 13, 1925

INVENTOR:
Arthur Augustine Passmore
BY: Francis E. Boyer
ATTORNEY

Patented Aug. 3, 1926.

1,594,376

UNITED STATES PATENT OFFICE.

ARTHUR AUGUSTINE PASSMORE, OF DORA CREEK, NEW SOUTH WALES, AUSTRALIA.

DEVICE FOR TEACHING NUMBERS IN COMBINATION, ANALYSIS, FACTORS, AND MULTIPLES.

Application filed March 13, 1925, Serial No. 15,181, and in Australia May 24, 1924.

This invention relates to devices for teaching numbers, and its object is to facilitate the teaching of numbers in combination, analysis, factors, and multiples; I accomplish this object by means of a tray or a frame divided into equal spaces by vertical lines, to a given scale, and movable blocks made to varying lengths and to the same scale, to fit in the tray or slide in or on the frame.

Figure 3:
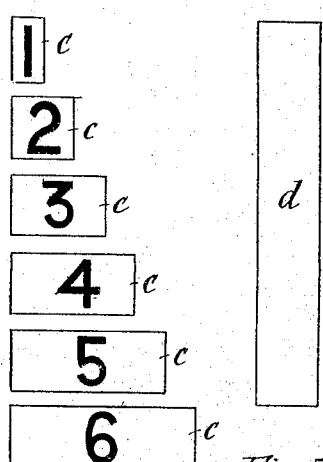
Figure 2:
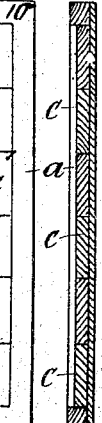
Figure 4:
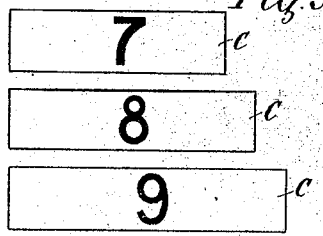
Figure 5:
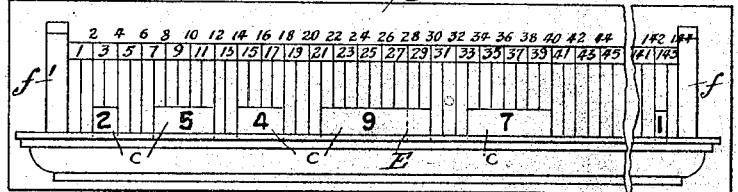
Figure 6:
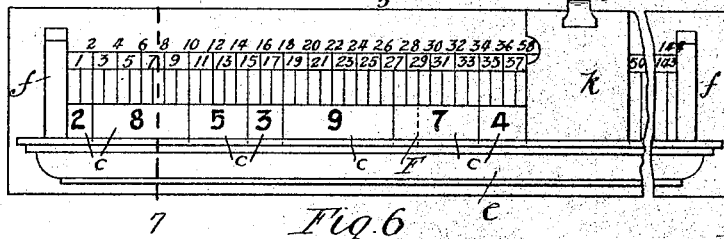
Figure 7:
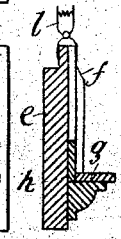

To facilitate explanation drawings are annexed in which, Fig. 1 is a front view of a tray for teaching from 1 to 10. Fig. 2 is a section of the same at 2—2. Fig. 3 a mask used in connection with Fig. 1. Fig. 4 a series of blocks numbered from 1 to 9. Fig. 5 a frame for teaching numbers in combination, analysis, factors, and multiples. Fig. 6 a frame for teaching subtraction. Fig. 7 a section at 7—7. Fig. 8 a tray showing a mask for the purpose herein described.

For teaching from 1 to 10, I provide a tray $a$, of cardboard, or other suitable material or materials, divided into 10 equal spaces by vertical lines to a given scale, numbered from 1 to 10, the spaces are preferably ½ inch apart, but may be spaced to any desired scale.

I also provide movable rectangular blocks of cardboard, wood, or other suitable material $c$, made to the same scale as the spaces on the tray and of varying lengths; for instance block numbered 1 will neatly fit in any one space on the tray, block numbered 2 will fit in any two spaces, block numbered 5 in any five spaces.

To teach to 10, facts may be shown as in Fig. 1:—9+1=10, 8+2=10, 7+3=10, 6+4=10, 5+5=10, 2+2+2+2+2=10 and it is seen that facts such as 5×2=10 or 2×5=10, 10—9=1, 10—8=2, 10—7=3, 10—4=6, 10—5=5 are facts readily proved by the device.

I also provide masks for determining at a glance all possible combinations to produce a given number. For instance, the mask $d$ shown in Fig. 3 consists of a rectangular strip of twice the width of one of the units of space on the tray. Therefore, if this mask is placed at the extreme right of the tray it will cover a width of two space units and expose only those numbered spaces which are involved in the different combinations which may be made to produce eight, namely 7+1, 6+2, 5+3, 4+4, 2+2+2+2. The mask $m$ shown in Fig. 8 is used for determining all possible combinations to produce seven, and exposes only the units of space into which the corresponding blocks showing such combinations can be fitted, namely 6+1, 5+2, 4+3. And so, for each number above 1, a mask may be provided which will cover all space units except those involved in the various combinations for producing said number.

For teaching numbers in combination, analysis, factors, and multiples, I employ a frame $e$ of wood, but which may be of any other suitable material or materials. The front of the frame, between the sides $f$ is divided by vertical lines, preferably ½ inch apart into equal spaces, but which may be to any other desired scale, numbered from 1 to say 144 from left to right; between a shelf $g$ and the back of the frame is a groove $h$ in which blocks $c$ similar to those shown in Fig. 3 are capable of sliding, the blocks in length are made to the same scale as that on the frame and are numbered.

The blocks may be placed in any position in the groove, and by closing them up to the left, the total of the numbers will be indicated on the scale, as for example shown in Fig. 5:—2+5+4+9+7+1, by closing up all the blocks to the left, the fact is proved by the last block indicating 28 on the scale, as indicated in dotted line E.

It is seen that by sliding the respective blocks in the groove, facts may be easily taught, such as:—6+3=9, 10—4=6, 6×6=36, 7 is a factor of 42.

For subtraction, a stop $k$ shown in Fig. 6 is arranged on the frame $e$ which is detachable and may be clipped to the frame by a clip or other fastener $l$, at any desired number on the scale.

As an example the blocks enclosed by the stop $k$ viz: 2, 8, 5, 3, 9, 7 and 4 are shown, which added together total 38, by removing the block 9 and sliding the remaining blocks to the left, the result 29 will be indicated on the scale by the last block as indicated by dotted line F.

I wish it understood that I do not confine myself to actual numbers in this invention, but symbols which indicate such numbers may be used, as in teaching numbers to the sightless, Braille characters may be employed.

Having now fully described and ascer- tained my invention and the manner in which it is to be performed, I declare that what I claim is:—

1. An educational device, comprising, in combination, a supporting member having one surface thereof divided by vertical lines into a plurality of consecutively numbered equal units of space, a series of consecutively numbered blocks of different lengths, the shortest block being of such length as to cover exactly one of said space units and each succeeding block being of such length as to cover exactly one unit more than the next preceding block, means carried by said supporting member for supporting the blocks for sliding movement from one end of the member to the other, and means projecting beyond the plane of said divided surface for limiting the sliding movement of the blocks.

2. An educational device, comprising, in combination, a supporting member having one surface thereof divided by vertical lines into a plurality of consecutively numbered equal units of space, a series of consecutively numbered blocks of different lengths, the shortest block being of such length as to cover exactly one of said space units and each succeeding block being of such length as to cover exactly one unit more than the next preceding block, the supporting member being provided with a wall projecting beyond the plane of its divided surface for supporting the blocks for sliding movement from one end of said member to the other and for limiting the movement of said blocks, and said blocks being of rectangular form whereby they may be supported one above another in a plurality of vertical tiers, the blocks of one tier being slidable with their edges in contact with the edges of adjacent tiers.

3. An educational device, comprising, in combination, a supporting member having one surface thereof divided by vertical lines into a plurality of consecutively numbered equal units of space, a series of consecutively numbered blocks of different lengths, the shortest block being of such length as to cover exactly one of said space units and each succeeding block being of such length as to cover exactly one unit more than the next preceding block, and masks, each adapted to cover a number of said space units and to expose only those units involved in the analysis of a predetermined number.

In testimony whereof I have signed my name to this specification.

ARTHUR AUGUSTINÉ PASSMORE.